United States Patent [19]
Beatty, Jr. et al.

[11] Patent Number: 4,870,532
[45] Date of Patent: Sep. 26, 1989

[54] ELECTRIC CIRCUIT FOR OPERATING TRIP CIRCUIT OF A CIRCUIT BREAKER

[75] Inventors: William E. Beatty, Jr., Brighton Township, Beaver County; Alan B. Shimp, Monroeville, both of Pa.

[73] Assignee: Westinghouse Electric Corp., Pittsburgh, Pa.

[21] Appl. No.: 236,099

[22] Filed: Aug. 24, 1988

[51] Int. Cl.[4] ............................................. H02H 3/08
[52] U.S. Cl. ..................................... 361/93; 361/94; 324/424
[58] Field of Search ...................... 361/93, 96, 94, 95, 361/97, 98; 324/424, 522, 527

[56] References Cited
U.S. PATENT DOCUMENTS

| | | | |
|---|---|---|---|
| 3,689,801 | 9/1972 | Engel et al. | 307/77 X |
| 3,818,275 | 6/1974 | Shimp | 361/96 |
| 3,826,951 | 5/1974 | Mater et al. | 335/160 |
| 3,852,660 | 12/1974 | Maier et al. | 324/424 |
| 3,924,160 | 12/1975 | Maier et al. | 324/424 X |
| 4,351,013 | 9/1982 | Matsko et al. | 361/96 |
| 4,727,448 | 2/1988 | Hanyada et al. | 361/93 X |

Primary Examiner—Derek S. Jennings
Attorney, Agent, or Firm—M. J. Moran

[57] ABSTRACT

An organo-platinum complex of the formula

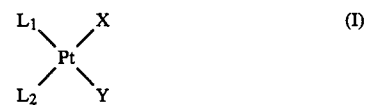

wherein X and Y have the same meaning of a halogen, oxyanion or carboxylate, respectively or X is an oxyanion or dicarboxylate together with Y, and $L_1$ and $L_2$ are bonded together to form one of silicon containing diamine compounds selected from the group consisting of

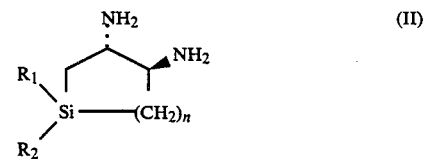

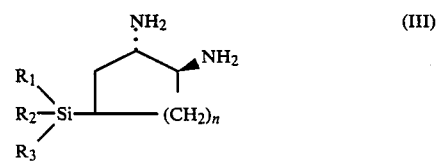

and

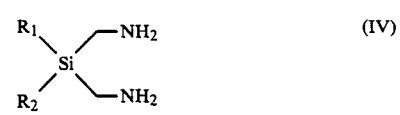

in which $R_1$, $R_2$ and $R_3$ are a lower alkyl or phenyl, respectively, and n is an integer of 0 or 1, and use of the complex for an anti-tumor composition.

20 Claims, 8 Drawing Sheets

ELECTRIC CIRCUIT FOR OPERATING TRIP CIRCUIT OF A CIRCUIT BREAKER

BACKGROUND OF THE INVENTION

1. Field of the Invention

This invention relates to an electric circuit, which may be incorporated in a removable plug, for converting a signal proportional to the current in an electrical conductor to a voltage signal for use in operating the trip circuit of a circuit breaker which opens the circuit of the electrical conductor in response to an overcurrent condition. In particular, it is related to such a circuit which incorporates active electronic components powered by a signal proportional to current and which can be used to adjust the rating of the circuit breaker, to compensate for non-linearities in the transformer which generate the signal proportional to current and/or to test the circuit breaker. It can also provide an indication of an overcurrent condition prior to tripping of the breaker and an indication of sufficient current to perform the test.

1. Background Information

In some types of circuit breakers, the operating point at which the breaker trips is set by a replaceable rating plug containing resistance which is inserted into a solid state trip circuit in the circuit breaker. The trip circuit in turn controls the tripping of the breaker. The secondary current from current transformers in the breaker flows through the rating plug and the voltage across the rating plug is therefor proportional to the product of the breaker current and the rating plug resistance. If the resistance in the rating plug is made greater, the required current to produce a given voltage across the rating plug is decreased and vice versa. Because the trip circuit "sees" the rating plug voltage as a measure of the breaker current, changing the rating plug resistance effectively changes the current rating of the breaker.

A problem often arises in such circuit breakers because, at very high currents, the current transformers supplying the rating plug saturate and become non-linear. The reason for this non-linearity is the small space available inside a circuit breaker to fit current transformers. This limit on available space forces the amount of copper and iron in the transformer to be minimized, resulting in saturation at high currents and therefore, the secondary current is less than proportional to the breaker current. The result is that at high currents, the rating plug voltage is less than proportional to the breaker current. This is an undesirable situation because a greater than normal current is required to trip the breaker. A means of compensating for current transformer non-linearity would be desirable.

Some rating plugs provide an adjustable rating for the circuit breaker. One type of such rating plugs contains a relatively high power rheostat in series with a fixed resistor so that the rating plug resistance can be continuously varied over a range of values. The problem with this type of adjustable rating plug is that the high power rheostats are large and potentially unreliable. An adjustable rating plug not requiring the use of a high power rheostat would be desirable.

Another type of adjustable rating plug utilizes a number of series connected resistors and a switch for selectively inserting a desired amount of resistance into the circuit. This arrangement eliminates the bulky potentiometer but stills dissipates a large amount of power and does not provide for continuous or fine adjustments of the rating setting. Thus it would be desirable to have a rating plug which would offer the continuous adjustment of the potentiometer but without the bulk and high power consumption.

The above discussed circuit breakers with solid state trip units have been tested by supplying the trip circuit with a relatively low current from an external test source. The output from the test source simulates an overcurrent condition in the breaker causing it to trip with the appropriate delay. The problem with using a separate test source is that since its output simulates an overload condition, it is also large enough to damage delicate solid state circuitry if it persists for a sufficient length of time. When a trip occurs due to an actual overcurrent flowing through the breaker, the current supplied to the solid state trip circuitry ceases when the breaker trips and, therefore, the trip circuit is automatically protected. In a simulated overcurrent condition, using an external test source, however, the current supplied to the solid state trip circuitry is not automatically interrupted when the breaker trips. If the external test source is accidentally left on for an extended time, damage can occur to the trip circuit.

Such a test unit powered by an external source is disclosed in U.S. Pat. Nos. 3,852,660 and 3,924,160. This test unit selectively generates a lower current test signal for verifying the delayed trip, and a high level current signal which tests the instantaneous trip feature. To avoid the prolonged application of the high level signal, a timer circuit disconnects the high level signal after a predetermined interval. However, this can produce a large pulse which can be a problem. There remains therefore a need for means for testing circuit breakers which does not require separate source and which would eliminate the possibility of trip unit damage.

In some circuit breakers in which the trip circuit is powered by the current flowing through the breaker, the breaker must be carrying at least about half rated power in order for the trip circuit to operate. There is a need therefore for an indication that sufficient current is flowing through such a breaker in order to perform a test.

It is also known to provide a means indicating that a circuit breaker is experiencing an overload. However, this feature adds cost to and complication to the trip unit and may not be required or needed by all users. A simple way to add this feature to the trip unit after it is manufactured or as an option feature would be desirable.

SUMMARY OF THE INVENTION

These and other needs are satisfied by the invention which is directed to an electric circuit for generating an adjustable sensing voltage signal for the trip circuit of a circuit breaker from the input current signal provided by the circuit breaker current transformers. The circuit includes an active variable impedance connected in series with a reference resistor between two terminals which serve as the input to the trip circuit. The active variable impedance is energized by the input current, and thus, no external source is required. Control means connected across the two terminals selectively control the impedance of the active variable impedance device to adjust the voltage across the two terminals produced by the input current. This voltage can be adjusted through various features of the invention to provide continuous adjustment of the rating of the circuit breaker over a selected range, to provide compensation for non-linearity in the current transformers which generate the input current, and to test the circuit breaker without disconnecting it.

Preferably, the active variable impedance comprises a high gain transistor amplifier, such as a Darlington transistor, controlled by an operational amplifier. The control means includes a pair of diodes in series with a reference voltage selection circuit across the two terminals. The forward drop across the two diodes is comparable to the drop across the Darlington transistor when fully turned on. The reference voltage selection means applies a reference voltage to the non-inverting input of the operational amplifier controlling the high gain amplifier. A feedback connection applies the voltage between the Darlington transistor and the reference resistor to the inverting input of the operational amplifier so that the output of the amplifier, and therefore the variable impedance in series with the reference resistor, varies with the reference voltage selected.

A potentiometer, preferably with protection for failure of the potentiometer in the open condition, may be used to adjust the reference voltage, thereby providing continuous adjustment of the circuit breaker rating over a wide range.

As another feature of the invention, one or more zener diodes can be used with a voltage divider to provide a voltage versus input current characteristic which compensates for non-linearities caused by saturation of the current transformers generating the references current.

In a preferred form of the invention, these two features, continuous adjustment of the circuit breaker rating and compensation for non-linearities of the current transformers, are combined.

Another feature of the invention includes a test switch which when actuated inserts a zener diode and resistor into the reference voltage selection circuit to substantially lower the reference voltage thereby turning down the output of the high gain amplifier and substantially raising the voltage across the terminals to simulate a fault current for testing the circuit breaker. Since the trip circuit is powered by the input current which must be about half the rated current of the breaker to operate the trip mechanism, an indicator device, such as an LED, powered by another operational amplifier which compares the voltage across the reference resistor to a reference voltage generated from the forward drop across the diodes, can be provided with the test feature.

In addition, an indicator such as another LED or another type of alarm can be provided to indicate an overcurrent condition.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

Figure 1:
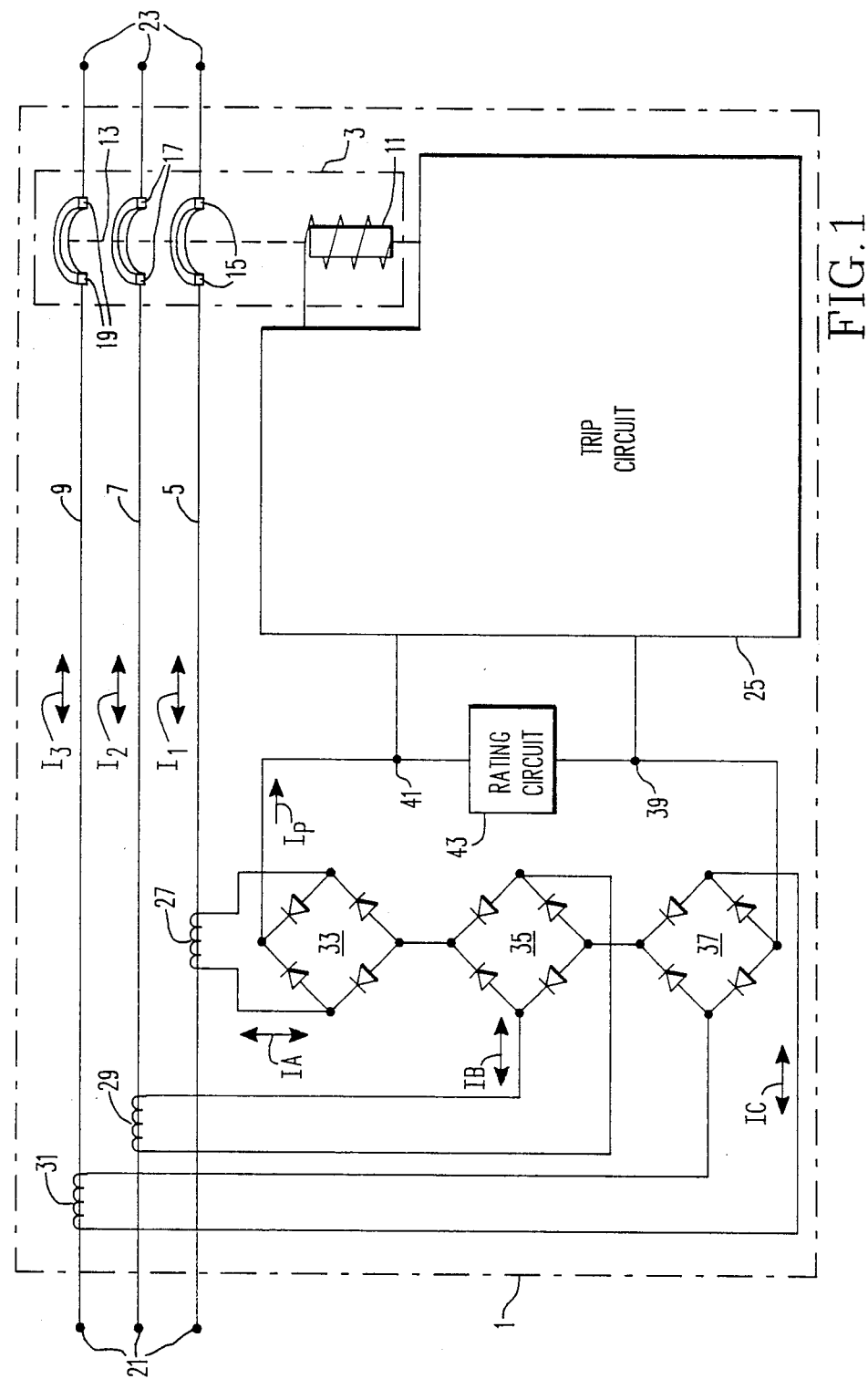
FIG. 1 is a electric circuit diagram partly schematic and partly in block diagram form of a circuit breaker incorporating the invention.

FIG. 1 discloses a circuit diagram, partly schematic and partly in block diagram form, of a circuit breaker 1 which includes a trip mechanism 3 having at least one pair of separable main contacts which are adapted to open and close to protect an electrical conductor. Conductors 5, 7 and 9 are examples of such a conductor. The trip mechanism 3 includes opening means operable to actuate the contacts to the open position. The opening means includes a trip coil 11 having a movable plunger attached to a linkage 13 which is connected to and moves the separable main contacts 15, 17 and 19 on the lines 5, 7 and 9 respectively. These lines may be connected at terminals 21 and 23 to the electrical conductors of a three-phase electrical system in which are flowing currents $I_1$, $I_2$ and $I_3$ respectively.

Interconnected with the trip coil 11 is a trip circuit, generally designated 25 in FIG. 1. Any trip circuit may be used provided it can actuate the trip coil 11, and may be energized by means which will be described. In the exemplary embodiment shown, the trip circuit 25 is a known solid state trip circuit which may include an instantaneous trip and a delayed trip feature.

The currents in lines 5, 7 and 9 are monitored by current monitors such as the current transformers 27, 29 and 31, respectively. The outputs of the current transformers 27, 29 and 31 are applied to fullwave bridge rectifiers 33, 35 and 37 respectively. The outputs of the fullwave bridge circuits 33, 35 and 37 are connected in series to a pair of terminals 39 and 41. The bridge circuits 33, 35 and 37 provide an input current $I_p$ which is representative of the largest of the three currents flowing in the lines 5, 7 and 9 as is known in the art.

Terminals 39 and 41 are connected to the inputs to the trip circuit 25 and to the inputs of an electric circuit 43 which is the subject of this invention. In the exemplary embodiment of the invention, the electrical circuit 43 is in the form of a rating plug which, as will be discussed more thoroughly below, may be removably inserted into the housing of a circuit breaker. The circuit 43 converts the current produced by the rectifier bridge circuit into an adjustable voltage which is seen by the trip circuit 25 as representative of the current flowing in the electric system. As will be seen, circuit 43 is capable of adjusting the voltage produced by a given current delivered to the terminals 39 and 41 in order to vary the rating of the circuit breaker 1. Circuit 43 may also be used to compensate for non-linearities created by saturation of current transformers 27, 29 and 31 in the circuit breaker. It also provides a self-energized test circuit for the circuit breaker and can provide indications of sufficient power available to perform the test and indications of overload current.

Figure 2:
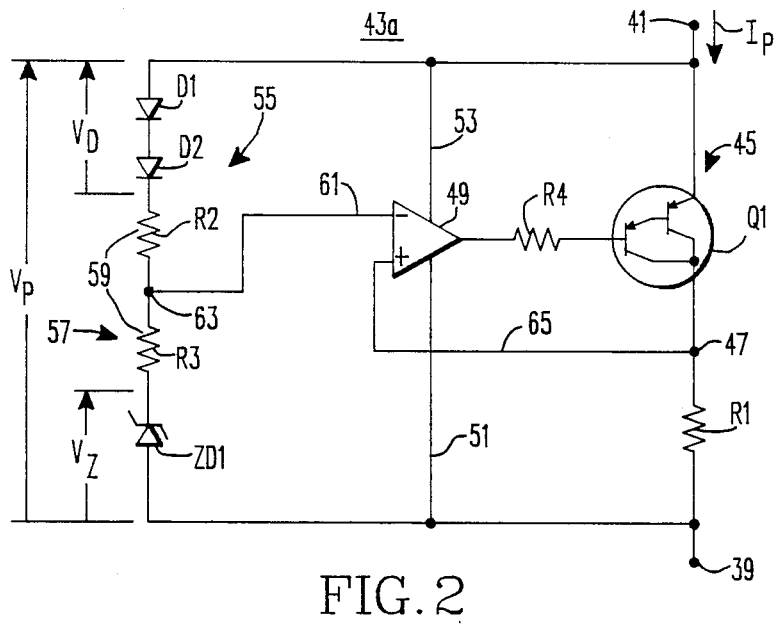
FIG. 2 is a schematic circuit diagram of one embodiment of the invention providing compensation for saturation of the input current transformers.

FIG. 2 illustrates one embodiment of the invention which compensates for saturation of the current transformers in the circuit breaker. The circuit 43a includes a reference resistor $R_1$ connected to the first terminal 39 and an active variable impedance means 45 connected to the second terminal 41. In the exemplary embodiment of the invention, the active variable impedance means includes a high gain transistor amplifier, such as the Darlington transistor $Q_1$ which is connected through series connection 47 with the reference resistor $R_1$ between the terminals 39 and 41. The active variable impedance means 45 also includes an operational amplifier 49. The operational amplifier 49 is of a type which can operate from a single ended power supply such as, for example, an LM 158, 258 or 358. As can be seen from FIG. 2, the operational amplifier 49 is powered through leads 51 and 53 connected to the terminals 39 and 41. Thus, the operational amplifier is powered by circuit breaker current and no additional source is required. The active variable impedance means is controlled by a control circuit 55. The control circuit includes a pair of diodes $D_1$ and $D_2$, and reference voltage selection means 57 in the form of a voltage divider 59 comprising resistors $R_2$ and $R_3$, and a zener diode $ZD_1$ all connected in series between the terminals 39 and 41. A lead 61 connects the tap point 63 of the voltage divider 59 to the inverting input of the operational amplifier 49. A lead 65 applies the voltage at the series connection 47 between $Q_1$ and $R_1$ to the non-inverting input of the operational amplifier 49. The output of the operational amplifier 49 drives the Darlington transistor $Q_1$ through bias resistor $R_4$.

The operation of the circuit 43a of FIG. 2 is as follows. The output of the operational amplifier 49 is regulated to adjust the gain of the transistor amplifier $Q_1$ to make the voltage at the non-inverting input of the operational amplifier equal to the voltage at its inverting input. Thus, the voltage at the series connection 47 is made equal to the voltage at the tap point 63 of the voltage divider 59. If the current $I_p$ is low, the zener diode $ZD_1$ does not conduct. Due to the high input impedance of the operational amplifier 49, there is very little current through the resistor $R_2$, and thus the voltage applied to the non-inverting input of the operational amplifier 49 is essentially equal to the forward drop $V_d$ across the diodes $D_1$ and $D_2$. The voltage $V_p$ generated by the circuit 43a across the terminals 39, 41 is equal to the voltage drop across the reference resistor $R_1$ and the drop created by the variable impedance of the transistor $Q_1$ and may be expressed as follows:

$$V_p = I_p \times R_1 + V_d \qquad \text{(Eq. 1)}$$

Except for the term $V_d$, the voltage $V_p$ across the terminals 39 and 41 is exactly the same as with the common fixed resistor rating plug. Fixed voltage $V_d$ can easily be compensated for in the trip circuitry 25.

If the current through the circuit 43a is increased, a value of current, $I_1$, is reached where:

$$I_p \times R_1 = I_1 R_1 = V_z \qquad \text{(Eq. 2)}$$

Where $V_z$ is the breakover voltage of the zener diode $ZD_1$. If the current through the circuit 43a is increased further to a still higher value, $I_2$, then current begins to flow through the zener diode $ZD_1$ resulting in a voltage drop in the voltage divider 59 made up of resistors $R_2$ and $R_3$. Under these conditions, where $I_p$ is equal to $I_2$:

$$V_p = I_2 R_1 + (I_2 - I_1) R_1 \times \frac{R_2}{R_3} + V_d \qquad \text{(Eq. 3)}$$

The first term of equation 3 is the voltage drop across the reference resistor $R_1$, the second term is the voltage drop across the resistor $R_2$ and the third term is the drop across the diodes $D_1$ and $D_2$.

Figure 3:
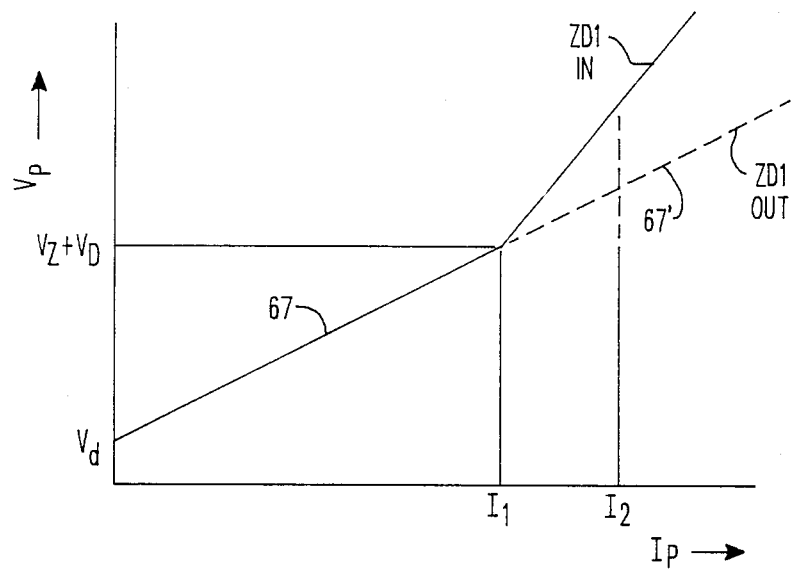
FIG. 3 is a plot of input current versus output voltage for the circuit of FIG. 2.

The result is that the voltage across the terminals 39, 41 increases at a greater rate than the input current $I_p$, as shown in FIG. 3. As will be noted by the trace 67 in FIG. 3, $V_p$ increases linearly from $V_d$ to $V_d$ plus the zener voltage $V_z$. For input currents above $I_1$, the voltage $V_p$ increases linearly at a greater rate. Without the zener diode $ZD_1$, the voltage across the terminals 39, 41, would continue to increase linearly as shown by the dotted line extension 67'.

The advantage of the circuit of FIG. 2 is that by proper choice of the values of $V_z$, $R_2$ and $R_3$ the voltage across terminals 39, 41 can be made to compensate for current transformer non-linearity. This occurs because, while at high currents the ratio of current transformer output to primary current falls off, the ratio of the voltage across terminals 39, 41 to the input current, $I_p$, increases at an offsetting rate.

As an additional improvement to the circuit of FIG. 2, compensation can be provided for changes in ambient temperature. The current transformer non-linearity is caused primarily by the increase with temperature in the resistance of the copper wire in the secondary winding. By making resistor $R_2$ from copper wire, or another temperature sensitive material, the $V_p$ versus $I_p$ curve for the circuit of FIG. 2 can be made to compensate for the change in transformer non-linearity with temperature.

Figure 4:
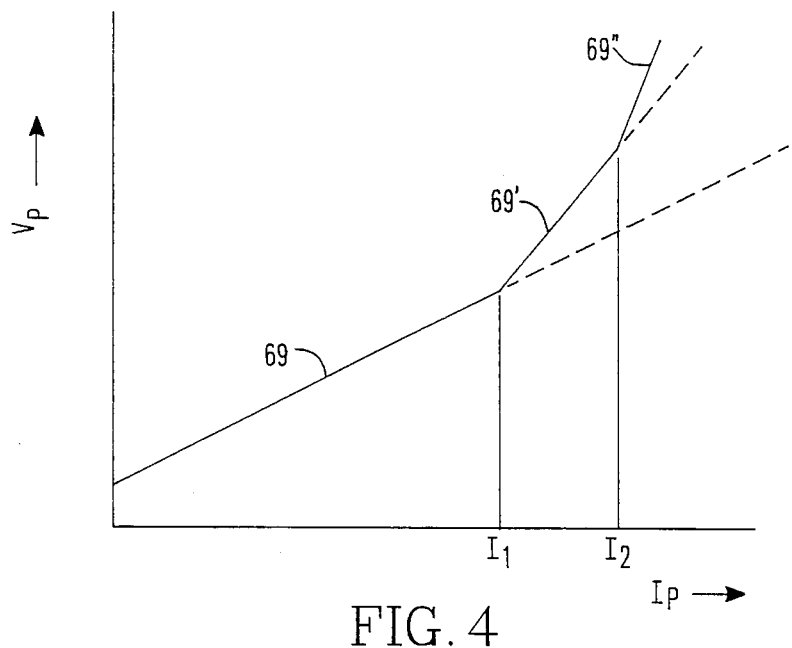
FIG. 4 is a plot of an input current versus output voltage characteristic for a modification to the circuit of FIG. 2.
Figure 5:
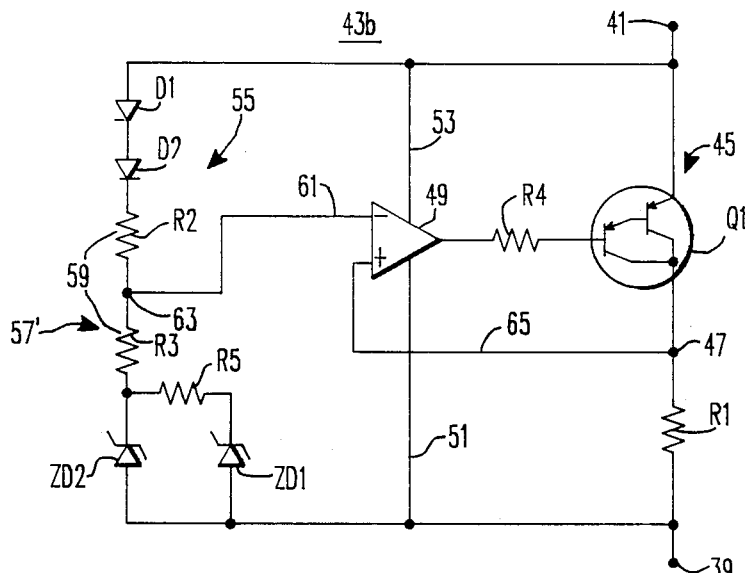
FIG. 5 is a schematic circuit diagram of an embodiment of the invention generating the current versus voltage characteristic of an embodiment depicted in FIG. 4.

Further refinements to this concept are possible by adding two or more break points to the $V_p$ versus $I_p$ characteristic. A typical curve 69 is shown in FIG. 4 and circuit 43b suitable for implementing this feature of the invention is shown in FIG. 5. In FIG. 5, components identical to those in FIG. 2 are identified by the same reference character. An additional resistor, $R_5$, in series with zener diode $ZD_1$, and an additional zener diode $ZD_2$ are added to the reference voltage selection circuit 57'. With this arrangement, the $V_p$ versus $I_p$ trace 69' breaks upward at $I_1$ when $ZD_1$ begins to conduct. The slope of the trace 69' is altered by the resistor $R_5$ which is in series with $R_2$ and $R_3$. Above $I_2$ when the breakover voltage of zener $ZD_2$ is reached across the resistor $R_5$ and $ZD_1$, $ZD_2$ conducts increasing the slope of the trace 69" as shown. It can be appreciated that additional zener diodes and resistors can be added to the circuit of FIG. 5 to approximate other non-linear $V_p$ versus $I_p$ characteristics.

Figure 6:
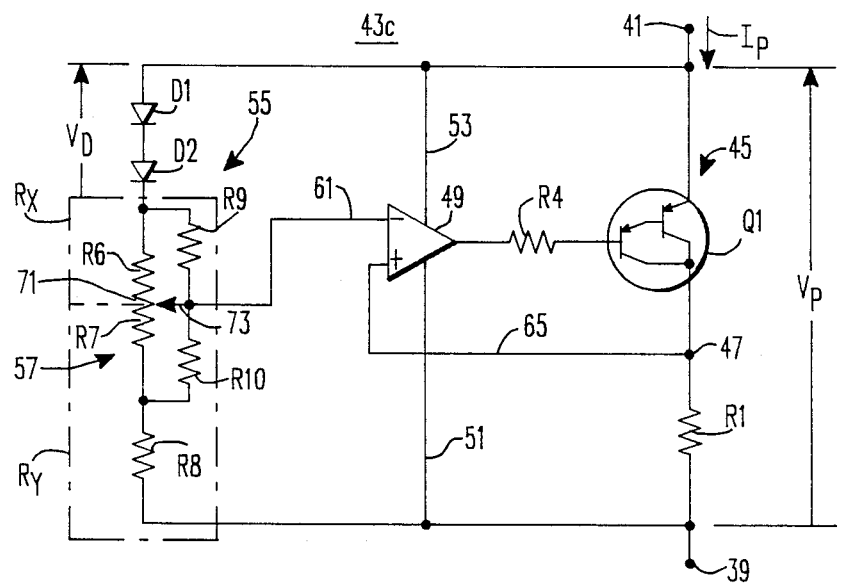
FIG. 6 is a schematic circuit diagram of another embodiment of the invention providing an adjustable rating for a circuit breaker.

FIG. 6 illustrates another embodiment of the invention. Again components in the circuit 43c which are the same as in FIGS. 2 and 5 are given like reference characters. In this embodiment, the reference voltage generator 57 of the control circuit 55 comprises a potentiometer 71 having a wiper 73 which divides the resistive element into resistances $R_6$ and $R_7$. A resistor $R_8$ is connected in series with the potentiometer between the diodes $D_1$ and $D_2$ and the first terminal 39. Fixed resistors $R_9$ and $R_{10}$ shunt the variable resistances $R_6$ and $R_7$ of the potentiometer 71. These fixed resistors serve dual purposes. First, they increase reliability because they enable the circuit 43c to continue to function even though the potentiometer 71 should fail open. Second, by proper choice of the values of $R_8$, $R_9$ and $R_{10}$, the circuit 43c rated current value versus angle of mechanical rotation of the wiper 73 can be made more linear than it would be without them. This is desirable for making accurate settings of rated current.

For simplifying analysis of the circuit 43c of FIG. 6, the resistances $R_6$ and $R_9$ can be combined and called $R_x$. Similarly, the resistance $R_7$, $R_8$ and $R_{10}$ can be lumped into the quantity $R_y$. Thus, in the circuit of FIG. 6, $V_p$ is related to $I_p$ by:

$$V_p = \frac{R_x + R_y}{R_y} \times R_1 \times I_p + V_d \tag{Eq. 4}$$

The values of $R_x$ and $R_y$ are determined by the setting small, low power potentiometer 71, and in effect, act as a multiplier for resistor $R_1$. The result is a continuously adjustable rating circuit 43c which does not require the use of a large, high power rheostat. The effect of the fixed voltage $V_d$ is exactly the same as in the previously described circuits.

Figure 7:
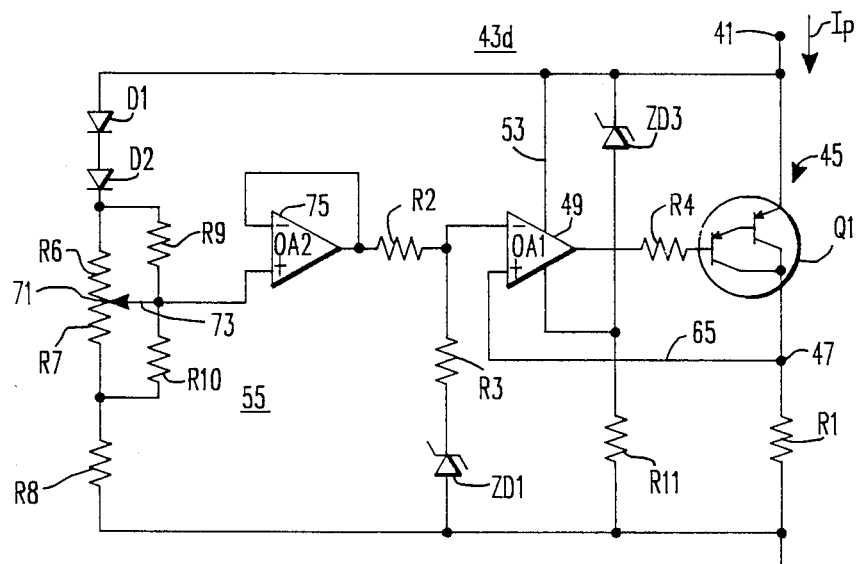
FIG. 7 is a schematic diagram of an embodiment of the invention incorporating the features of the embodiments of FIGS. 2 and 6.

The two concepts of the circuits of FIGS. 2 and 5 and of the circuit of FIG. 6 can be combined into one preferred embodiment as shown in FIG. 7. In this circuit 43d, a second operational amplifier 75 acts as a buffer to prevent loading of the potentiometer 71. Typically, the two operational amplifiers 49 and 75 can be part of the same integrated circuit. The purpose of zener diode ZD3 and resistor $R_{11}$ is to limit the operational amplifier supply voltage to a safe value in case of high input currents. Alternatively, these components can be replaced by external means to limit either the current through or the voltage across the rating circuit. Although not shown for clarity, the zener diode ZD3 and resistor $R_{11}$ also limit the supply voltage to operational amplifier 75.

Figure 8:
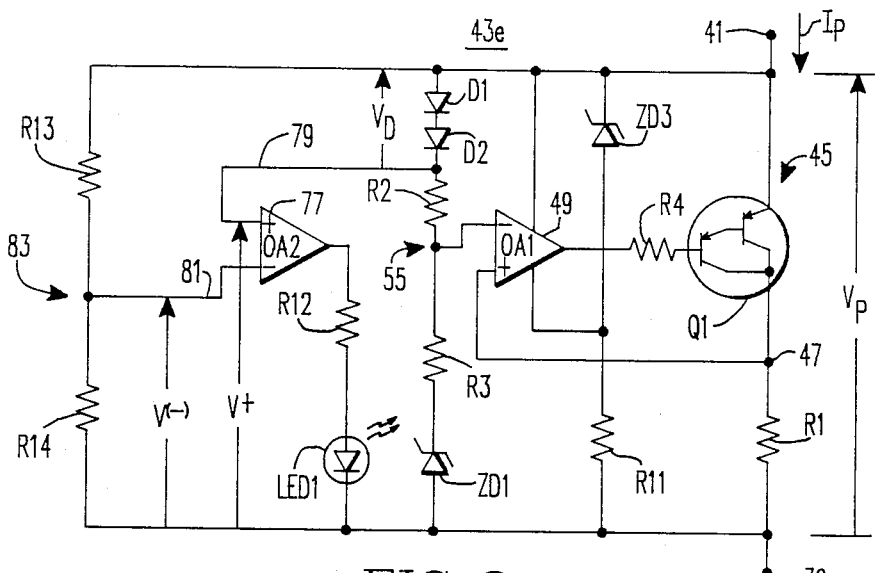
Fig. 8 is still another embodiment of the invention providing an indication of an overcurrent condition.

A simple means of indicating that the circuit breaker 1 is experiencing an overload condition is provided in the embodiment of the invention disclosed in FIG. 8. This circuit 43e includes a light emitting diode LED1 which is controlled by an additional operational amplifier 77 through resistor $R_{12}$. Again, the operational amplifiers 49 and 77 can be combined in a single integrated circuit with their supply voltages limited by zener diode ZD3 and resistor $R_{11}$. The non-inverting input of the operational amplifier 77 is connected by a lead 79 to the junction between the diode $D_2$ and resistor $R_2$. The inverting input of the operational amplifier 77 is connected by a lead 81 to a voltage divider 83 comprising resistors $R_{13}$ and $R_{14}$ connected across the terminals 39, 41.

In the circuit 43e of FIG. 8, Q1, $R_1$ to $R_4$, ZD1, D1, D2, operational amplifier 49, ZD3, and $R_{11}$ perform the basic rating function with compensation for current transformer non-linearities described in connection with circuit 43a of FIG. 2. $R_{12}$ to $R_{14}$, operational amplifier 77 and LED1 perform the overload indication function. The indicating portion of circuit 43e works as follows. The voltage, $V_{(+)}$, at the non-inverting input of operational amplifier 77 is:

$$V_{(+)} = V_p - V_d \tag{Eq. 5}$$

The voltage, $V_{(-)}$, at the inverting input to operational amplifier 77 is:

$$V_{(-)} = \frac{R_{14}}{R_{13} + R_{14}} \times V_p \tag{Eq. 6}$$

Figure 9:
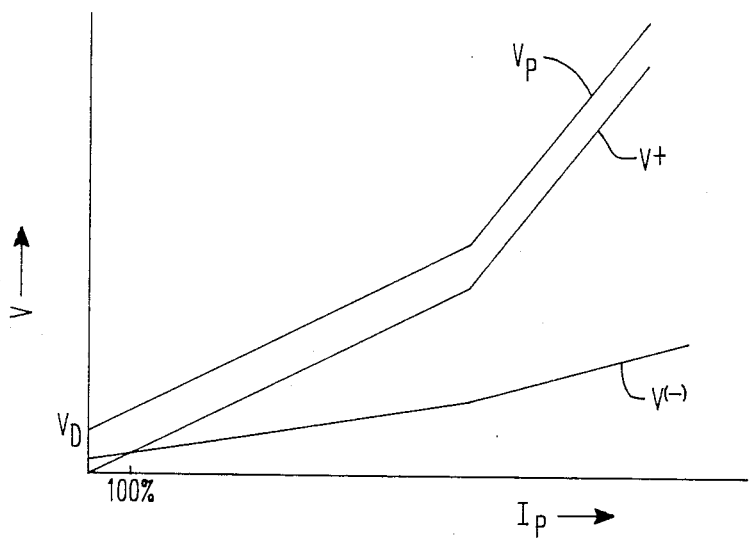
FIG. 9 is a plot of the selected voltages in the circuit of FIG. 8 versus current.

The voltage $V_p$ across the terminals 39, 41, is related to the current $I_p$ through the circuit 43e as shown in FIG. 9. Also shown in FIG. 9 are the voltages $V_{(+)}$ and $V_{(-)}$ versus $I_p$. At low values of $I_p$, $V_{(+)}$ is less than $V_{(-)}$, the output of operational amplifier 77 is low and the light emitting diode, LED1, is off. At higher values of $I_p$, $V_{(+)}$ is greater than $V_{(-)}$, the output of operational amplifier 77 is high, and LED1 is on indicating the presence of an overload. By the proper choice of $R_{13}$ and $R_{14}$, the $V_{(+)}$ line can be made to cross the $V_{(-)}$ line exactly at the current $I_p$ at which an overload commences. In other words, LED1 can be made to turn on for all values of breaker current greater than rated current. This occurs when:

$$V_{(-)} = \frac{R_{13} + R_{14}}{R_{14}} \times V_d \tag{Eq. 7}$$

Although the use of a light emitting diode is the preferred method of indicting an alarm, other devices could be used to perform the same function. For example, other types of lights, acoustical indicators, or mechanical types of indicators could be used in place of LED1. The overload indication is useful in cases of moderate overloads where there is a long delay, for instance 15 to 20 seconds or more, before the breaker trips. The overload indication gives an operator the option of taking action which may prevent the breaker from tripping.

Figure 10:
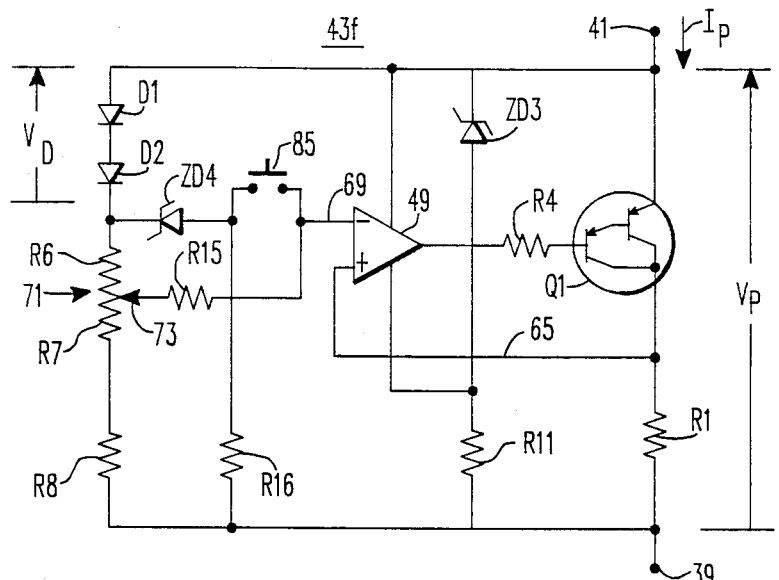
FIG. 10 is an additional embodiment of the invention incorporating a test feature.

Another modification of the invention is shown in FIG. 10. This version of the rating circuit 43 provides a self-test function for the breaker. This circuit 43f includes in addition to the potentiometer 71 for adjustably setting the current rating of the breaker, a resistor R15 connected in the lead 69 between the wiper 73 on the potentiometer and inverting input of the operational amplifier 49. It also includes a zener diode ZD4 and series resistor $R_{16}$ shunting the potentiometer 75 and resistor $R_8$ in series with the potentiometer. A test switch 85 selectively connects the connection between the zener diode ZD4 and resistor $R_{16}$ to the inverting input of the operational amplifier 49.

Under normal conditions, the test switch 85 is not depressed, and the circuit of FIG. 10 operates in a manner similar to that of the circuit of FIG. 6. That is, adjustment of the position of the wiper 73 of the potentiometer 71, adjusts the current rating of the breaker. The voltage $V_p$ is determined from equation 4 except that $R_x$ and $R_y$ do not include $R_9$ and $R_{10}$. Typically $V_d$ is approximately 1.5 volts and $R_1 \times I_p \times$ the potentiometer multiplier is approximately two volts at rated breaker current. Under normal conditions, that is no overload, the breaker current is less than or equal to rated current and $V_p$ is therefore between 1.5 and 3.5 volts. If the test switch 85 is depressed, the voltage at the inverting end of the operational amplifier 49 is decreased to a low value because of the $R_{15}$, $R_{16}$ voltage divider where $R_{15}$ is much greater than $R_{16}$. Since the non-inverting input of the operational amplifier 49 now has a greater voltage than the inverting input, the output of the operational amplifier 49 increases cutting off the Darlington transistor $Q_1$. Some of the current $I_p$ that was previously flowing through the Darlington transistor $Q_1$ now flows through ZD4 and $R_{16}$ so that the non-inverting and inverting pins of the operational amplifier 49 again have equal voltages. At this point;

$$V_p = I_p \times R_1 + V_d + VZD4 \qquad (Eq. 8)$$

By proper choice of the breakover voltage of ZD4, $V_p$ can be made equal to 13.5 to 15.5 volts with the test switch 85 depressed, which is a voltage equivalent to six to seven times rated breaker current. Under those conditions, the solid state trip circuit "sees" a six to seven times overload and causes a trip either with a long delay, with a short delay, or instantaneously. Note that, although the trip circuit "sees" an apparent six or seven times overload, the actual current flowing in the rating circuit 43f and solid state trip circuit during the test is an equivalent to less than full load current. This level of current does not have the potential to cause circuit damage. Also, since the rating circuit 43f is powered by current from the protected line, the test is automatically terminated when the breaker trips. Both of these factors prevent any possible trip circuit damage during testing.

It should be noted that the numerical values given in the above example are for the purposes of illustration only.

A limitation on the use of this test feature of the invention occurs on circuit breakers whose solid state trip units are powered solely by the current flowing through the breaker. For an actual trip test to be possible in such breakers, the breaker must be carrying sufficient load current, typically more than half of the frame rating, to be able to cause the shunt trip to operate.

Figure 11:
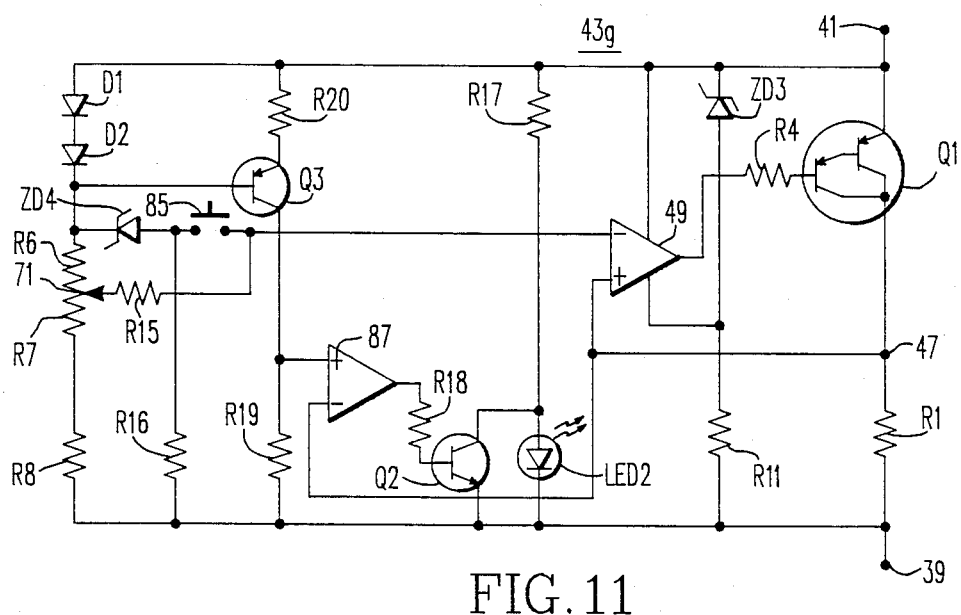
Fig. 11 is a modified form of the embodiment of the invention shown in FIG. 10 providing an indication of sufficient current to perform a test.

Accordingly, FIG. 11 illustrates a preferred form of this embodiment of the invention which includes an LED in the circuit 43g which turns on whenever a preset value of current is flowing through a circuit breaker. This LED is used to indicate when it is possible to perform a test.

The indicator means in FIG. 11 includes light emitting diode LED 2 connected in series with a resistor $R_{17}$ across the terminals 39, 41. An electronic switch in the form of transistor $Q_2$ shunting LED 2 turns the light emitting diode on when the transistor $Q_2$ is off and turns LED 2 off when the transistor $Q_2$ is turned on. Transistor $Q_2$ is controlled by a current detecting circuit which includes an operational amplifier 87 controlling transistor $Q_2$ through base resistor $R_{18}$. The operational amplifier 87 compares the voltage across the reference resistor $R_1$ which is proportional to the current $I_p$, applied to its inverting input, with a constant voltage representing the current $I_p$ necessary to perform the test applied to its non-inverting input. This constant voltage is generated across a resistor $R_{19}$ by the collector current of a transistor $Q_3$ connected as an emitter follower across the diodes $D_1$ and $D_2$. Since the voltage drop across the diodes is constant, $Q_3$ supplies a constant current to the resistor $R_{19}$. A resistor $R_{20}$ in series with the emitter of transistor $Q_3$ provides the proper bias for that transistor.

A typical test sequence using this embodiment of the invention would be as follows. Assume that the breaker has only one adjustment, for short delay pickup. First a check would be made that the breaker was carrying at least half of the rated frame current. This would be indicated by illumination of LED2. The existing setting of the short delay adjustment would then be noted. Next this adjustment would be set maximum. Typically eight to ten times rated breaker current. Then the test switch would be depressed and the breaker should trip on long delay and typically in five to fifteen seconds. Then the breaker would be reset and the short delay adjustment set at the minimum. Again, the test button would be depressed and the breaker should trip in a fraction of a second. The short delay adjustment would then be returned to its original setting, the breaker reset and normal operations allowed to continue.

Figure 12:
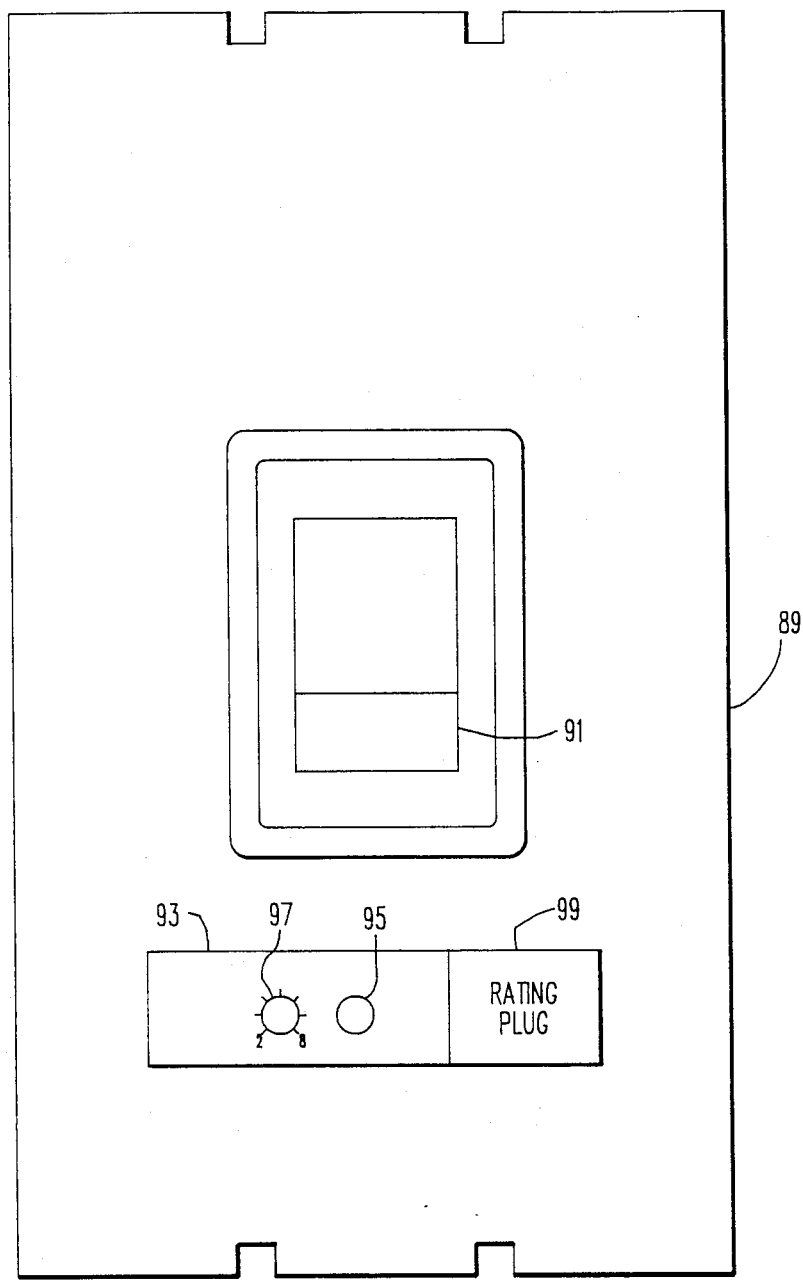
FIG. 12 is a front elevation view of a molded case circuit breaker in which the electric circuit of the invention is incorporated in a removable rating plug.
Figure 13:
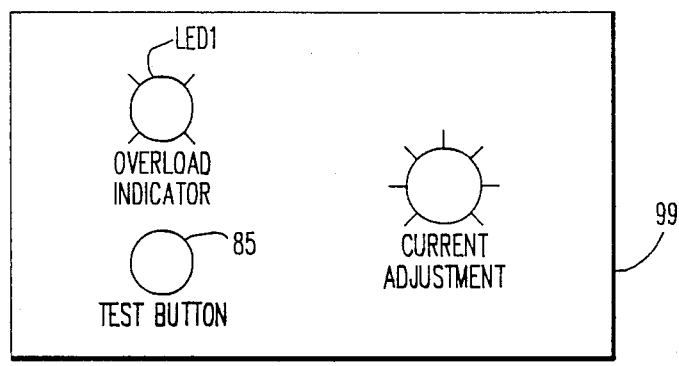
FIG. 13 is an enlarged front elevation view of a rating plug incorporating features of the invention and is shown in FIG. 12 installed in a circuit breaker.

The circuit of the invention may conveniently be incorporated in a removable rating plug which may easily be inserted into and withdrawn from a circuit breaker. FIGS. 12 and 13 illustrated this application of the invention. In FIG. 12, the circuit breaker 89 is, for example, of the type disclosed in U.S. Pat. No. 3,826,951. The circuit breaker is controlled manually by a handle 91 which protrudes through an opening in the front cover of the breaker. The breaker 89 also includes a removable insert 93 containing the electronics for the trip circuit of the breaker. This insert 93 includes a push button 95 by which the breaker can be manually tripped and a rheostat 97 through which the short delay of the breaker may be adjusted in a known manner.

The insert 93 also includes a removable rating plug 99 containing a desired form of the circuit of the present invention. As shown in FIG. 13, the operating knob 101 of the potentiometer 71 for adjusting the rated current of the breaker protrudes through the front face of the rating plug 99. The test switch 85 is also mounted in the rating plug for access from the front of the breaker, as is the overload indicating LED1. Alternatively, or in addition, the test light, LED2, may be presented in the rating plug 99. Preferably, the rating plug is provided with an interlock as described in U.S. Pat. No. 3,826,951 so that the breaker will not close without a rating plug in place. The rating plug 99 can be easily replaced to provide different combinations of the features made available by the invention.

It should be understood that other variations of basic circuitry illustrated are possible. By way of example, Darlington transistor $Q_1$ can be replaced by a single transistor with high gain. Also operational amplifiers requiring dual voltage supply can be used if a separate negative voltage supply is provided.

It can appreciated from the above discussion and the drawings that the invention provides a simple means for compensating for non-linearities in the current transformers of circuit breakers. It also provides a means of continuously adjusting the circuit breaker rating without the use of a large, high powered, unreliable rheostat. The invention also provides for making an overload indicator part of a replaceable rating circuit. This has two main advantages. The basic trip circuit does not have to include or be capable of including an overload indicator. For this reason, it can be made simpler and at a lower cost than if an overload trip indicator were included. In addition, since the indicating function is contained in the rating plug which is easily replaced, the overload indicator can be added to a circuit breaker just before it is shipped to a customer, or can even be added after the breaker is in service. The invention further provides an integral self-powered means for testing a circuit breaker which can include means for indicating when sufficient current is available for testing a self-powered circuit breaker. Finally, any or all of the above features can be combined in a replaceable plug which can be installed in the circuit breaker.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electric circuit powered by means generating an input current proportional to current flowing in an electrical conductor and adapted to generate a selectively adjustable sensing voltage signal from said input current for use by a trip circuit of a circuit breaker connected to open circuit the electrical conductor in response to an overcurrent therein, said electric circuit comprising:
    first and second terminals to which said input current is applied;
    a reference resistor connected to the first terminal;
    active variable impedance means connected to the second terminal and in series with the reference resistor at a series connection, said active variable impedance means also having connections to said first and second terminals for energization by said input current; and
    control means connected across said first and second terminals having an impedance at least several times higher than that of the series connected reference resistor and active variable impedance means for selectively controlling the impedance of the active variable impedance means to thereby selectively adjust the voltage across said first and second terminals produced by the input current.

2. The electric circuit of claim 1 wherein said active variable impedance means comprises:
    a high gain transistor amplifier connected to control current flow between said second terminal and the series connection with said reference resistor;
    an operational amplifier with its output connected to control said high gain transistor amplifier; and
    a feedback connection connecting said series connection between said transistor and said reference resistor to the non-inverting input of said operational amplifier.

3. The electric circuit of claim 2 wherein said control means comprises:
    diode means connected to said second terminal having a forward voltage drop comparable to a forward drop across the high gain transistor amplifier when fully turned on, and
    reference voltage selection means in series with said diode means and the first terminal generating a selected reference voltage, and
    means applying the selected reference voltage to the inverting input of said operational amplifier.

4. The electric circuit of claim 3 wherein said reference voltage selection means comprises:
    potentiometer means connected between the diode means and the first terminal and with a wiper on said potentiometer generating said reference voltage.

5. The electric circuit of claim 4 including first and second fixed resistors shunting the potentiometer and providing a modified reference voltage to the inverting input of the operational amplifier to protect against an open circuit of the wiper.

6. The electric circuit of claim 3 wherein said reference voltage selection means comprises a zener diode and a resistor means connected between said diode means and the first terminal to generate a reference voltage which changes value when the voltage developed across the reference resistor exceeds the breakover voltage of the zener diode.

7. The electric circuit of claim 3 wherein said means generating said input current is current transformer means which saturates at high currents in said electrical conductor and wherein said reference voltage selection circuit comprises a voltage divider connected to the diode means to generate said reference voltage and a first zener diode connected between the voltage divider and said first terminal, said first zener diode having a breakover voltage which is reached when said current transformer means saturates, and said voltage divider being selected to generate a reference voltage which is adjusted by current passed by the zener diode to compensate for saturation of the current transformer.

8. The electric circuit of claim 7 wherein said reference voltage selection means further includes a second zener diode and an additional resistor in parallel with said first zener diode, said second zener diode having a lower breakover voltage than the first zener diode and being selected together with said additional resistor to provide an intermediate level of compensation as said current transformer means begins to saturate.

9. The electric circuit of claim 7 including a buffer stage, a potentiometer having a wiper, means connecting one end of the potentiometer to the diode means, means connecting the other end of the potentiometer to the first terminal, and means connecting said buffer stage between the wiper and the voltage divider.

10. The electric circuit of claim 3 including a series connected zener diode and test resistor in parallel with said reference voltage selection means between said diode means and first terminal, and a switch selectively applying the voltage across the test resistor to the inverting input of said operational amplifier, said test resistor and zener diode being selected to generate a reference voltage which results in a voltage across said first and second terminals which represents a preselected overcurrent condition in said electrical conductor.

11. The electric circuit of claim 10 wherein said reference voltage selection means comprises a potentiometer connected between the diode means and the first terminal and with a wiper on said potentiometer generating said reference voltage.

12. The electric circuit of claim 10 including indicator means connected between said first and second terminals to provide an indication of when said input current is large enough that the voltage across said test resistor is large enough to generate a voltage across the first and second terminals representative of the selected overcurrent condition when said switch is selected to apply the voltage across said test resistor to the inverting input of the operational amplifier.

13. The electric circuit of claim 12 wherein said indicator means includes an indicator device connected to the first and second terminals, an electronic switch shunting said indicator device to energize said indicator device when the electronic switch is off and to short circuit said indicator device when the electronic switch is on, and current detecting means responsive to the current through said reference resistor for selectively turning said electronic switch off and on.

14. The electric circuit of claim 13 wherein said current detecting means includes an additional operational amplifier having an output connected to control said electronic switch, means applying the voltage across said reference resistor to the inverting input of said additional operational amplifier, and means applying a constant set point voltage to the non-inverting input of said additional operational amplifier.

15. The electric circuit of claim 14 wherein said means applying a constant set point voltage to the non-inverting input of the additional operational amplifier comprises a transistor connected as a voltage follower across said diode means to generate a constant current and a set point resistor through which the constant current flows to generate the constant set point voltage.

16. The electric circuit of claim 15 wherein said indicator device is a light emitting diode.

17. The electric circuit of claim 2 wherein said operational amplifier is energized by said input current through a current limiting resistor connected to one of said terminals, and a current controlling zener diode connected in parallel with positive and negative power inputs to the operational amplifier between the current limiting resistor and the other terminal.

18. The electric circuit of claim 2 wherein said high gain transistor amplifier is a Darlington Transistor.

19. The electric circuit of claim 3 including means connected between said first and second terminals providing an overcurrent indication when the input current represents an overcurrent condition based upon a circuit breaker rating determined by the references voltage selection means and the reference resistor.

20. The electric circuit of claim 19 wherein said overcurrent indication means comprises another operational amplifier, an overcurrent indicator device connected between the output of said another operational amplifier and said first terminal, an additional voltage divider connected across said first and second terminals and generating a proportional voltage proportional to the voltage across the first and second terminals, means applying said proportional voltage to the inverting input of said another operational amplifier and means connected between said diode means and said reference voltage selection means to apply the voltage applied to said reference voltage selection means to the non-inverting input of said another operational amplifier, said additional voltage divider being selected to generate a proportional voltage which exceeds the voltage applied to the reference voltage selection means and turns on said over current indicator device when said input current reaches a rated value for the circuit breaker set by the reference voltage selection means and said reference resistor.

* * * * *

UNITED STATES PATENT AND TRADEMARK OFFICE
CERTIFICATE OF CORRECTION

PATENT NO. : 4,870,532

DATED : September 26, 1989

INVENTOR(S) : W. E. Beatty, Jr., Alan B. Shimp

It is certified that error appears in the above-identified patent and that said Letters Patent is hereby corrected as shown below: On the title page, the "ABSTRACT" should appear as follows:

-- A removable rating plug for a circuit breaker provides an active variable impedance in series with a reference resistor between the sensing terminals of the circuit breaker trip circuit to adjust the sensing voltage produced in response to the input current received from current monitors in the protected circuit. The active variable impedance, which is energized by the input current, includes a high gain transistor amplifier, preferably a Darlington transistor, controlled by an operational amplifier. A control circuit includes a pair of reference diodes which match the forward drop across the Darlington transistor when full on, in series with a reference voltage selection circuit which applies a reference voltage to the non-inverting input of the operational amplifier. The voltage at the connection between the Darlington transistor and the reference resistor is fed back to the inverting input of the operational amplifier so that the gain of the amplifier, and therefore the variable impedance in series with the reference resistor, varies with the reference voltage. --

Signed and Sealed this

Eleventh Day of September, 1990

*Attest:*

HARRY F. MANBECK, JR.

*Attesting Officer*      *Commissioner of Patents and Trademarks*